(12) United States Patent
Henn et al.

(10) Patent No.: US 11,318,640 B1
(45) Date of Patent: May 3, 2022

(54) METHOD FOR MAKING A CONTINUOUSLY CAST SLAB AND THE RESULTING MOLD PLATE

(71) Applicant: Edro Specialty Steels, Inc., Walnut, CA (US)

(72) Inventors: Terry O. Henn, Walnut, CA (US); Kristopher D. Welch, Walnut, CA (US); Christian A. Rottmair, Walnut, CA (US); Robert J. Friedrich, Walnut, CA (US); Michael A. Guscott, Walnut, CA (US)

(73) Assignee: EDRO SPECIALTY STEELS, INC., Walnut, CA (US)

( * ) Notice: Subject to any disclaimer, the term of this patent is extended or adjusted under 35 U.S.C. 154(b) by 0 days.

(21) Appl. No.: 16/365,464

(22) Filed: Mar. 26, 2019

Related U.S. Application Data

(60) Provisional application No. 62/652,801, filed on Apr. 4, 2018.

(51) Int. Cl.
*B29C 33/38* (2006.01)
*C22C 38/02* (2006.01)
*C22C 38/04* (2006.01)
*C22C 38/60* (2006.01)
*C22C 38/46* (2006.01)
(Continued)

(52) U.S. Cl.
CPC .............. *B29C 33/38* (2013.01); *C21D 8/005* (2013.01); *C22C 38/001* (2013.01); *C22C 38/02* (2013.01); *C22C 38/04* (2013.01); *C22C 38/42* (2013.01); *C22C 38/46* (2013.01); *C22C 38/60* (2013.01);
(Continued)

(58) Field of Classification Search
USPC ......................................................... 148/608
See application file for complete search history.

(56) References Cited

U.S. PATENT DOCUMENTS

| 6,045,633 A | 4/2000 | Henn et al. |
|---|---|---|
| 6,358,334 B2 | 3/2002 | Henn et al. |
| (Continued) | | |

OTHER PUBLICATIONS

Pehlke, Robert. "Steel Continuous Casting." ASM Handbook, vol. 15: Casting. pp. 819-925. 2008. (Year: 2008).*

*Primary Examiner* — Brian D Walck
(74) *Attorney, Agent, or Firm* — Stetina Brunda Garred & Brucker

(57) ABSTRACT

A martensitic stainless steel is produced by continuously casting a melt comprising 0.0.04%-0.065% by weight C, about 0.25%-0.5% by weight Si, about 0.9%-1.2% by weight Mn, up to 0.025% P by weight, about 0.1%-0.16% by weight S, about 11.9%-12.8% by weight Cr, up to about 0.35% by weight Ni, about 0.5%-0.65% by weight Cu, about 0.03%-0.06% by weight N, about 0.02%-0.1% by weight V, and the balance being Fe with residual impurities, at a temperature between 2730° F. to 2820° F. and a specific casting speed to form a continuous strand of the alloy while not splitting or cracking. The strand is cut to length to form a slab which is descaled and hot worked during the subsequent hot working process where its thickness is reduced to form a plate of a specific gauge and width while not splitting or cracking at a segregation line through the slab and plate during hot working. Hot working of the continuously cast slab may be provided by either rolling or forging or a combination of both. The mold plate is air cooled.

12 Claims, 3 Drawing Sheets

(51) Int. Cl.
*C22C 38/00* (2006.01)
*C21D 8/00* (2006.01)
*C22C 38/42* (2006.01)
*B22D 11/00* (2006.01)

(52) U.S. Cl.
CPC ...... *B22D 11/001* (2013.01); *C21D 2211/008* (2013.01)

(56) References Cited

U.S. PATENT DOCUMENTS

| | | | | |
|---|---|---|---|---|
| 2008/0069719 | A1* | 3/2008 | Beguinot | ................ B29C 33/38 420/61 |
| 2012/0273092 | A1* | 11/2012 | Ratte | ........................ C21D 1/06 148/325 |

* cited by examiner

METHOD FOR MAKING A CONTINUOUSLY CAST SLAB AND THE RESULTING MOLD PLATE

CROSS-REFERENCE TO RELATED APPLICATIONS

The application claims the benefit under 35 U.S.C. § 119(e) to Provisional Patent Application No. 62/652,801 filed Apr. 4, 2018, the entire contents of which are incorporated herein by reference.

BACKGROUND

The injection molding of plastic parts occurs in a mold between various numbers of male cores and female cavities which are retained in the mold base. The mold base is made up of a number of mold plates of similar width and length, in various gauges. The mold base plates require a different material than the cores and cavities. As used herein, the reference to a mold base includes a reference to a mold plate when no mold plates are additionally specified. The mold cores and cavities typically require fully hardened steels that provide properties including wear resistance, corrosion resistance, toughness and thermal conductivity. These properties are required for the molding of the different plastics used for high volume part production. The mold bases allow for use of softer metals, but require stable and accurate positioning and toughness over the production life of the mold, when large forces are applied consistently, and in some cases require stainless steel for corrosion resistance.

Mold bases for plastic injection molds were made earlier from carbon and low alloy steels. Improved plastics, higher operating stresses, larger and higher cavitation tooling, longer production runs and inherent corrosion problems all led to the use of stainless steels to make the mold bases. One successful stainless steel for use in making mold bases is disclosed in U.S. Pat. No. 6,045,633. This martensitic stainless steel, produced exclusively using bottom poured ingots, allowed increased ductility and lower hardness which was needed for the extensive hot working that transformed the resulting ingots into rolled plates, without catastrophic cracking during the hot working of the plates. This stainless steel allowed suitable surface quality even after the hot working of the ingot, and allowed improved formability of the resulting plates without breaking as the ingots were flattened during hot working. The resulting stainless steel also reduced edge tearing during hot working of the ingots, resulting in improved yield of the hot rolled plate and also reduced the expensive edge trimming prior to hardening of the plate rolled from the ingots. The resulting stainless steel also allowed low residual stresses from hardening and thus increased dimensional stability during later machining operations as extensive machining was carried out on the stainless steel. The resulting steel had simplistic weldability so the molds machined from the steel could be reliably repaired or modified. The resulting stainless steel also had improved resistance to corrosion and reduced "breakout" at the exit surfaces when drilled, even after the extensive hot working of the ingots and plates. Breakout occurs when the metal surrounding the drill exit area fractures and tears away when the drilling force exceeds the strength of the material creating a ragged hole edge.

Unfortunately, the stainless steel disclosed in U.S. Pat. No. 6,045,633 was such that it was not suitable for production from continuous strand cast slabs because it was believed the chemical composition made the slab susceptible to cracking, which at best could result in unacceptable interruption to production, and at worst serious damage to the caster. Thus, U.S. Pat. No. 6,045,633 discloses producing the steel starting with a bottom poured ingot that is subsequently hot worked to form plate. Ingots have several disadvantages including the higher levels of residual impurities at the top and bottom of the ingot, the increase of unusable material because of the asymmetrical shape of the tapered ingot, and the increased risk of cracking during hot working as the ingot cools owing to the excessive time required to convert ingots to plate as reflected in part by the material properties discussed which were needed to allow the hot working of the ingots to produce the plates of stainless steel which could be supplied to customers, either as full plate or saw cut to size, for each mold base produced. There is thus a need for a cast slab material for the plastics mold base industry that requires less hot working to produce a suitably thick plate for use in producing molds for plastic parts yet having desirable properties for hot working, hardenability, ductility, formability, flatness, residual stresses, breakout, corrosion resistance, weldability and edge tearing suitable for use in making molds for plastic injection.

Further, bottom poured ingots are expensive to produce, especially compared to continuous strand casting methods. Continuous strand casting has a melt of molten metal continuously dispersed through an opening in the bottom of a ladle into an elongated and downwardly inclined mold within which the metal cools to form a strand that is cut off to form slabs, in widths of up to 40 inches and lengths of up to 600 inches The steel of U.S. Pat. No. 6,045,633 was not suitable for continuous strand casting methods for several reasons including that the chemical composition made the slab susceptible to cracking during strand casting, and to cracking during subsequent hot working. The continuous cast slabs cool more rapidly from the outside toward the centerline of the metal than do ingots. The more rapid cooling of slabs causes higher internal stresses within the material. In combination with the segregation of elements like Manganese, Sulphur and Phosphorous at the centerline which lowers strength and ductility the material is prone to crack in this area and caused the continuously cast slab to split or crack through the segregation line when the slab was hot worked into plate. The composition or chemical analysis was adjusted to avoid cracking of the slab during casting and of the resulting plates during hot working of the continuous cast slab, while still achieving acceptable hardness, ductility, formability, flatness, residual stresses, breakout, corrosion resistance, weldability and edge tearing.

Ingots cool at a much slower rate than the continuously cast metal slabs resulting in much lower internal stress levels and therefore not as susceptible to center line cracking/splitting when rolled into plate. There is thus a need for a less expensive way to produce a metal with the above advantages and properties, but that is suitable for continuous casting.

BRIEF SUMMARY

A martensitic stainless steel is produced by continuously casting a melt comprising 0.04%-0.065% by weight C, about 0.25%-0.5% by weight Si, about 0.9%-1.2% by weight Mn, up to 0.025% P by weight, about 0.1%-0.16% by weight S, about 11.9%-12.8% by weight Cr, up to about 0.35% by weight Ni, about 0.5%-0.65% by weight Cu, about 0.03%-0.06% by weight N, about 0.02%-0.1% by weight V, and the balance being Fe with residual impurities, at a temperature between 2730° F. to 2820° F. and a specific casting speed to form a continuous strand of the alloy while not cracking. The strand is cut to length to form a slab which is descaled and hot worked during the subsequent hot working process where its thickness is reduced to form a plate of a specific gauge and width while not splitting or cracking at a segregation line through the slab and plate during hot working. Hot working of the continuously cast slab may be provided by either rolling or forging or a combination of both. The mold plate is air cooled. The resulting mold plate has high machinability, stability and thermal conductivity, as well as reduced production costs from the ability to continuous cast the slab material.

In further variations the hot worked slab is cooled by free air cooling to room temperature. The segregation line may contain impurities which may include C, Si, Mn, P, S, Cr, Ni, Cu, N and V.

There is also provided a process for hot working the slab into plate without splitting, chipping or separating the slab at the segregation line of the slab, before the cooling of that said slab by free air cooling to room temperature. Hot working the slab to produce the plate suitable for plastic molding applications reduces the thickness of the slab to a preferred thickness that is about 20% to 35% of the initial thickness of the cast slab after descaling, and preferably about 30%, so that the hot rolled plate is much thinner than the cast slab after descaling. Alternatively phrased, the slab thickness is reduced by about 65% to 80% from the original cast slab thickness after descaling. The slab will have a visible segregation line on at least two opposing sides of the mold base block and usually all four sides of a rectangular plate suitable for mold base and mold plate applications, with the segregation line containing impurities which include C, Mn, P, S, Cr, Ni, Cu, N and V. The process may include hot leveling the plate after finalizing the hot working. The process may further include the step of aging the plate at a temperature range of up to 1050° F. to reach desired hardness level and properties, and preferably aging between about 700° F. to 1000° F.

There is also provided an improved mold block for use in plastic molding that includes a rectangular block of a martensitic, stainless steel alloy comprising 0.04%-0.065% by weight C, about 0.25%-0.5% by weight Si, about 0.9%-1.2% by weight Mn, up to 0.025% P by weight, about 0.1%-0.16% by weight S, about 11.9%-12.8% by weight Cr, up to about 0.35% by weight Ni, about 0.5%-0.65% by weight Cu, about 0.03%-0.06% by weight N, about 0.02%-0.1% by weight V, and the balance being Fe with residual impurities. The block may include segregation lines on at least two opposing sides of the block and typically on four sides of the block, with the segregation lines containing impurities which include C, Mn, P, S, Cr, Ni, Cu, N and V, which may include one or more of the listed constituent elements in pure form or in a compound form.

In further variations, the mold block may include at least one cavity opening onto one surface of the mold block and a plurality of holes opening onto the surfaces of said block. The mold block may take the form of a mold plate.

The method and material of the martensitic stainless steel disclosed herein were developed to achieve a continuously strand cast slab, of stainless steel, specifically for the plastics mold base industry. The continuous casting process produces semi-finished billets, blooms or slabs for subsequent hot working to plate. As used herein, the reference to continuously cast slabs includes billets, blooms, slabs, beam blanks, rounds and blooms and other continuously cast shapes. The important features of the alloy and the aspects which produce these features and allow continuous casting are as follows:

The chemical analysis of the stainless steel allows continuous casting without segregation that results in splitting the continuously cast slab during casting and hot working, resulting in cost and time savings. Because of a much higher yield is possible with continuous cast slabs, it is a less expensive process than using bottom poured ingots and then hot working the ingots into plates, while maintaining suitable properties for use in the plastics mold industry.

The chemical analysis of the stainless steel is designed to yield acceptable hardness for the intended application either as hot worked, as hot worked and stress relieved, as normalized or as normalized and stress relieved. No post hot working annealing cycles are required to protect the material from cracking.

The chemical analysis of the stainless steel is designed to provide sufficient ductility to avoid occurrences of drill breakout.

The chemical analysis of the stainless steel is designed to achieve good corrosion resistance suitable for the needs of the plastic molding industry, especially the balance of the low carbon level, and high chromium level and amount of copper.

The chemical analysis of the stainless steel has a hot worked surface quality allowing a reduction in gauge to meet final product sizes. This hot worked surface finish allows a reduction in machining and grinding costs to finished size and increases overall yield from the product The chemical analysis of the stainless steel has a reduced hot strength of the slab that allows more effective flattening during hot working. The resulting hot worked flatness may be completely free of waviness and wrinkles which eliminates the need for secondary cold or hot flattening operations. The improved flatness reduces the amount of machining required to produce clean, bright metal finishes required for mold base surfaces.

The chemical analysis of the stainless steel is designed to distribute the Sulphur throughout the slab and improve machinability as the machined chips break off. Yet the stainless steel has a high ductility that avoids hot tearing of the continuous cast slab edges during hot working and avoids breakout. The low carbon level and reduced hardenability result in a readily weldable material. The chemical analysis of the stainless steel is designed in a way to have an upper limit on the total amount of the alloying elements of 15.9% to provide an improved thermal conductivity compared to the steel in U.S. Pat. No. 6,045,633.

BRIEF DESCRIPTION OF THE DRAWINGS

These and other advantages and features of the invention will be better appreciated in view of the following drawings and descriptions in which like numbers refer to like parts throughout, and in which.

DETAILED DESCRIPTION

Figure 1:
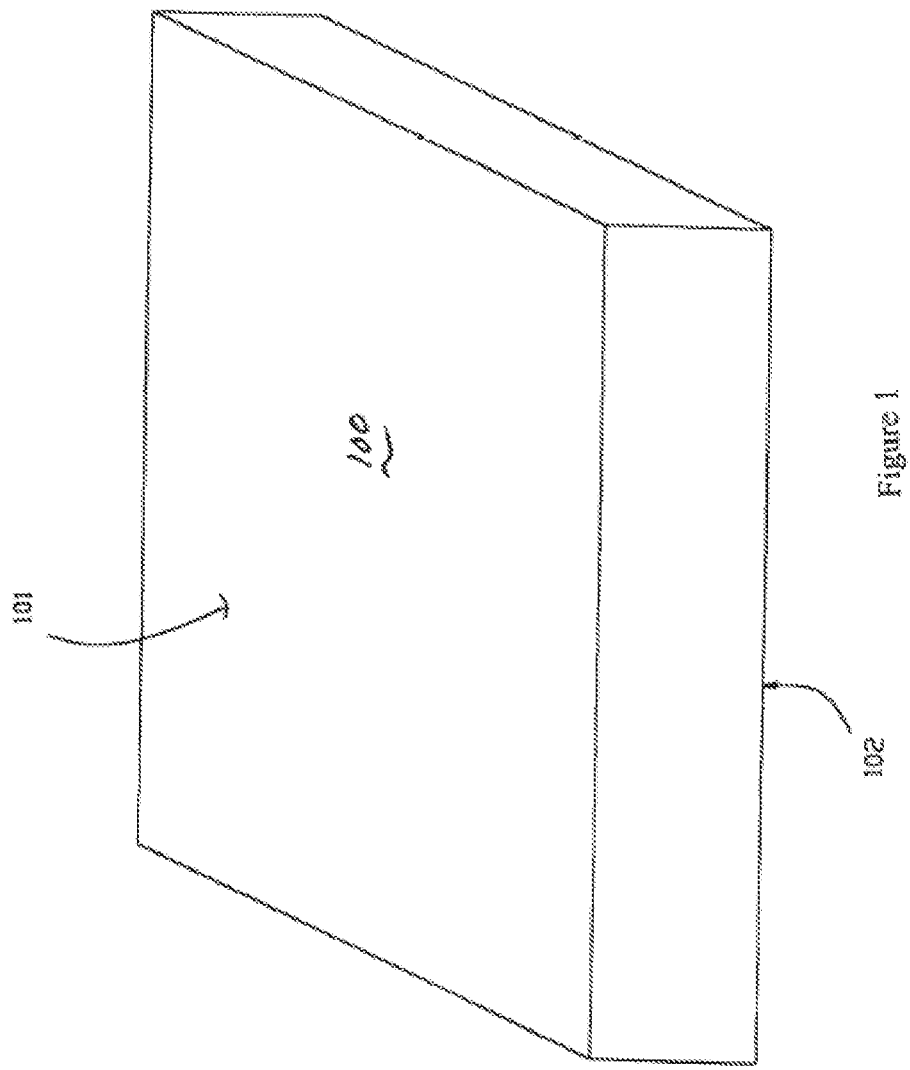
FIG. 1A is a perspective view of a continuously cast, stainless steel slab with a segregation line.
FIG. 1B is a perspective view of a rectangular mold plate made of a continuously cast, stainless steel as described herein.

A martensitic stainless steel is provided with less than 10% ferrite phase and chemical composition as shown in Table I. The material is electric furnace melted and further processed by AOD, VOD or other suitable means for producing low carbon stainless steels. The material is calcium treated to provide optimum control over the manganese sulfide morphology. The balance of the composition is 80% or more Fe and those impurities and tramp elements which are inevitably included during the melting, pouring, casting and processing of the material. The composition range of this stainless steel suitable for continuous strand casting slab material is given below in Table I

TABLE I

| Element | C | Si | Mn | P | S | Cr | Ni | Cu | N | V |
|---------|-----|------|-----|-------|------|------|------|------|------|------|
| min | 0.04 | 0.25 | 0.9 | N/A | 0.1 | 11.9 | N/A | 0.5 | 0.03 | 0.02 |
| max | 0.065 | 0.5 | 1.2 | 0.025 | 0.16 | 12.8 | 0.35 | 0.65 | 0.06 | 0.1 |

The function(s) of each of the intentionally included elements in the analysis are as follows:

Carbon 0.04-0.065%. Carbon combines with chromium to precipitate as a carbide, depleting the effective level of chromium which negatively affects corrosion resistance. Carbon level dramatically controls hardness attainable. The specified range maintains the carbon level low while still achieving the designed hardness levels and reducing separation during continuous casting sufficiently to allow continuous casting while not segregating during continuous casting sufficiently to cause or help cause splitting of the slab during hot working.

Silicon: 0.25 0 0.5%. Silicon acts as the primary de-oxidizer in the molten metal, but increasing levels of silicon produce ferrite structure, when a martensite structure is sought. The specified range of Silicon achieves sufficient deoxidizing action while not increasing segregation of other elements during continuous casting to cause or help cause splitting of the slab during hot working.

Manganese: 0.9 to 1.2%. Manganese combines with sulfur to form sulfides which distribute throughout the stainless steel to improve machinability, while not segregating sufficiently during continuous casting to cause or help cause splitting of the slab during hot working. The upper limit of 1.2% manganese is specified to control the embrittling effects of excess Manganese while combining sufficiently with Sulphur to form the desired sulfates. Manganese also acts as a strengthening agent, a de-oxidizer and as an austenite stabilizer helps prevent the formation of ferrite phase, thus favoring the martensitic phase.

Phosphorus: 0.00 to 0.025%. Phosphorous adds to hardenability of also causes brittleness which can increase the splitting of continuously cast slabs during hot rolling. The slight amount of Phosphorous takes advantage of a slight contribution to corrosion resistance and a positive benefit to machinability.

Sulfur: 0.1 to 0.16%. Sulfur is used to promote improved machinability. Sulfur at the specified level was balanced with Manganese to form sulfides that distribute sufficiently to improve machinability while not segregating during continuous casting to cause or help cause splitting of the slab during hot working. While avoiding segregation, the Sulfur also contributes to the hot working properties, toughness, ductility and corrosion resistance suitable for use on molds for plastic injection molding.

Chromium: 11.9 to 12.8%. Chromium enhances hardenability and the range is selected to achieve hardenability while not segregating during continuous casting to cause or help cause splitting of the slab during hot working. The specified amount of chromium helps achieve the desired martensitic structure in heavy cross-sections with air cooling, while allowing a low enough amount to control the formation of the ferrite phase below 10%, particularly in this grade with low carbon content. It also helps achieve the corrosion resistance sufficient for use in making molds for plastic injection molding. The Chromium level is required for corrosion resistance. A precise balance of Carbon and Chromium levels ensure sufficient free Chromium in the steel to achieve the desired corrosion resistance without compromising hardness level.

Nickel: none to 0.35%. Nickel is not desired as part of the alloy so it is specified variously as not applicable, none or 0.00%. But it is difficult to produce a ferrous alloy without trace elements of nickel occurring from contaminants in the melting and production equipment or from contaminants in the scrap used for the source of the ferrite that forms the bulk of the metal alloy. Thus, the amount of nickel is limited at 0.35%. Moreover, nickel increases ductility and therefore lowers machinability and would be expected to decrease separation at the segregation line, all of which are desirable for the present alloy. But the present chemical analysis achieves its machinability advantages and avoids segregation defects with little nickel content, and preferably with no nickel present.

Copper: 0.5 to 0.65%. The amount of copper is low enough to fully dissolve in the base metal matrix as a solid solution during continuous casting and thus does not segregate during continuous casting to cause or help cause splitting of the slab during hot working. The copper improves the corrosion resistance. Additionally, the copper allows the material to respond to a low temperature aging process which can be used to elevate the strength level of the material before or after machining while avoiding distortion or cracking problems.

Nitrogen: 0.0 to 0.35%. Nitrogen contributes to the corrosion resistance of the material and also acts to stabilize the austenite phase, improving hardenability and diminishing the occurrence of a ferrite phase. Nitrogen tends to form chromium rich nitride particles during aging and tempering and thus can reduce effectiveness of the chromium in corrosion resistance. The specified range of Nitrogen has been found to not result in segregation of intentionally added elements during continuous casting sufficient to cause or help cause splitting of the slab during hot working cause or help cause.

Vanadium: 0.02 to 0.1%. Vanadium forms a stable carbide precipitate which controls grain growth, necessary to avoid grain coarsening which would promote unacceptable low ductility. But Vanadium can also increase the formation of the ferrite phase, when a martensitic phase is desired. The specified range is believed to achieve the desired ductility and martensitic phase during continuous casting while not segregate during continuous casting to cause or help cause or help cause splitting of the slab during hot working.

Calcium injection in the molten metal provides shape control of the manganese sulfide inclusions in the hot worked steel to uniformly distribute the inclusions throughout the material and thus allow continuous casting while not segregating during continuous casting to cause or help cause or help cause splitting of the slab during hot working. The shape control also helps avoid elongated sulfides which are typical of non-calcium treated, resulfurized steels, which can lead to poor surface quality in machining, drill breakout and poor ductility, especially in directions transverse to the primary hot working direction.

Because the mold plates and mold bases produce parts consisting of hot molded plastics, a high thermal conductivity is important as it can reduce the cycle time and allow more production cycles of the mold and produce more molded products. The specified alloy has relatively small concentrations of elements and is believed characterized as a low alloy stainless steel and thus has a higher thermal conductivity than typical high alloy stainless steels. The thermal conductivity of the resulting alloy measured in $W/m^3K$, is about 25 at 32° C. and about 30 at 500° C. That is a noticeable improvement over the thermal conductivity of the prior art U.S. Pat. No. 6,045,633, which was measured as about 21 at 32° C. to 27 at 500° C.

Details of Manufacturing

Steel is produced as a low carbon stainless steel by electric furnace melting (or oxygen furnace), post melt refining, deoxidation, alloy trimming, sulfur addition and calcium injection treatment. The steel is tapped into a ladle and taken to a continuous strand casting machine. The ladle is typically raised onto a turret that rotates the ladle into a casting position above a tundish into which liquid steel flows from an opening in the ladle. The tundish feeds liquid steel into a mold at a predetermined rate to form a strand of steel with an outer surface that hardens to form a shell containing the liquid steel interior of the strand. The mold is typically a water-cooled copper mold that typically contacts and cools by conduction, four sides of the strand's cross-section to form an outer shell of sufficiently cooled steel to contain the interior, liquid steel. The strand is cut off to form a rectangular slab. As used herein, a slab with a rectangular cross-sectional shape includes a square cross-sectional shape, and a rectangular cubic piece of material. If shapes other than the rectangular cross-section are used then the mold shape will change but rectangular shapes are commonly used for producing cast slab. A slab with a rectangular cross-section is suitable for hot working to produce plate used as a mold base. Continuous strand cast slab is currently produced up to 12 inches in thickness, and up to 40 inches wide.

The common types of continuous casters use vertical casting, curved type casting, or advantageously vertical with bending in which the initial mold fed by the tundish is vertical with the mold or stem curving to a horizontal orientation. Advantageously, at least the initial portion of the mold may be inclined so the weight of the steel causes the strand to move along the length of the inclined mold. Mold lubricants and mold oscillation may be used to avoid the solidifying shell from sticking to the mold or tearing, and to avoid liquid steel breakouts. The strand may be supported by support rollers and partially by the downstream stem when the outer layer or shell of the slab is sufficient cooled by the actively cooled mold.

The slab with its cooled outer shell continues to move along a predetermined path on support rollers and cools further as it travels along that path. When the interior of the strand is sufficiently cooled, the strand is cut to form a slab of a desired length. At the beginning and end of the casting process a small amount of material is discarded that is not within the required composition specifications. The resulting cut slab is discharged for cooling in ambient air and transported to a steel mill with saw cutting capabilities where it is subsequently cut into smaller slabs of whatever weight or dimension size are needed to produce the required hot worked plate. These hot worked plates are then produced and sold directly as full plate, or are saw cut to customer's specific sizes for mold bases. Typically, the mold plate sizes vary from around 12×12×1 inch, to about 48×60×5 inches.

Depending on the casting method and cooling, the continuously cast slab has a segregation line of impurities extending across the cross-section of the slab, typically from side to side. The segregation line is actually a plane of impurities that is visible as a line extending across the edges of the slab and hence is referred to as a "line" when it is actually a plane, and because it is near the center of the slab is sometimes referred to as a segregation centerline. The location of the segregation line follows the temperature of the flowing metal as the solidifying metal crystals push impurities toward the liquid metal. The segregation line is typically at the center of the slab in the area that remains liquid the longest and away from the top or bottom surfaces of the slab that solidify the fastest.

The segregation line presents two problems. A first problem is that if the composition of the steel is not correct then when the slab is hot worked, the slab splits or cracks along the segregation line during hot working with potentially catastrophic results to the hot working equipment. The hot working reduces the slab thickness to a maximum of 30% of the original thickness of the slab after descaling and before hot working began, and the forces causing this deformation can cause the slab to split, separate or crack along the segregation line. The splits, separation or cracking may occur only at the ends of the slab, or along the entire segregation line, either of which can damage the hot working equipment and require shutting down the line, resulting in significant loss of production and damage to equipment. The hot working will compress the segregation line and thus compress voids and impurities within the segregation line, further concentrating the chemical impurities while reducing void defects. If the composition of the steel is correct, then the continuously cast slab does not split or crack at the segregation line during hot rolling.

A second problem is that the segregation line may present a visible line that may be visually apparent when the mold base plates are finish machined to bright metal surfaces. A user may be reluctant to accept a mold plate with a visible segregation line. It is believed that the segregation line of the composition described herein presents a finer line of reduced width and variation (e.g., less jagged) and lighter color than does a segregation line made with a different composition and subject to splitting, cracking or separation.

Segregation lines having high sulfur (e.g., above 0.2%) or high manganese (e.g., above 1.2%) are believed more susceptible to cracking or separation. But high sulfur increases machinability and that is a significant advantage for mold bases and mold plates. Machinability refers to the wear or life of the cutting tool when cutting the metal. For example, milling a blind cavity may wear out an end mill for each cavity in a steel with poor machinability, while several cavities may be formed by a single end mill in a steel with good machinability. The specified chemical composition is believed to consistently achieve a high machinability across the entire mold plate, while reducing the sulfur content well below 0.3% in the center believed to cause separation at the segregation plane.

Moreover, the slabs are cast in the rough rectangular shape of the ultimate machined molding plate but larger in gauge or thickness, and hot working of the slab reduces the gauge or thickness to the desired thickness of the molding plate. Rectangular-cross-sections are commonly used for mold bases and the sides of the slabs are sometimes cut off to achieve a better rectangular shape. The thickness of the cast slab is reduced by hot working to the approximate desired thickness of the molding plate. The hot working typically produces a plate having a thickness within about 0.5 inches of the desired machined plate thickness, whether used for a mold base or mold plate. The hot working will compress the segregation line and thus compress voids and impurities within the segregation line, further concentrating the chemical impurities while reducing void defects. The segregation line on the hot worked plate may contain impurities which include C, Mn, P, S, Cr, Ni, Cu, N and V, which may include one or more of the listed constituent elements in pure form or in a compound form. Typically, Cr forms a carbide, while N, Si and Mn form sulfides and V forms either a sulfide or carbide—all of which are believed to be formed in the segregation line, except for possibly Cu which, if it is in suitable solution during casting may be absent from the segregation line. The cast slabs are reduced in thickness by approximately 65% to 80% and preferably by approximately 70%—from the original thickness of the cast slab after descaling. The reduction in thickness advantageously occurs immediately after descaling, and preferably without reheating.

Hot working occurs after descaling. Because of the low carbon in the preferred chemical analysis, this hot working of the slab is believed to increase the martensitic phase in the stainless steel. But while conventional continuous casting methods may quench or water cool the slabs after the hot working is completed, the preferred method does not quench or water cool the slab and instead the hot rolled slab is allowed to air cool only. Rapid cooling is believed to reduce the martensitic phase in the hot worked plate. The air cooling is preferably passive, ambient cooling in the factory or outdoors.

The stainless steel composition is selected to allow continuous casting while avoiding splitting or cracking of the slab during hot working sufficient to reduce the thickness of the resulting plate to about 20% to about 35% of the original cast slab thickness after descaling, and preferably to reduce the thickness to about 30% of the original cast slab thickness after descaling. The reduction in thickness advantageously occurs immediately after descaling, and preferably without reheating. Hot rolling passes through rollers which can be up to 15 passes to produce a plate of desired gauge. Hot working by forging uses press forging, as by hydraulic presses to achieve the same reduction in thickness, and advantageously does not use impact forging such as drop forging. The chemical analysis thus advantageously allows continuous casting to produce a slab of stainless steel with desirable properties suitable for use in making plates for mold bases. The continuously strand cast method allows the more efficient production of the steel for the molding plates. The continuously casting process has shown to reduce the amount of wasted material as the ends of a bottom poured ingot plate are typically unsuitable for use as a mold plate. As a continuously cast slab can extend the length of many ingots the percentage of wasted material is much lower.

Hot working of the continuously cast slab to plate may be provided by either rolling or forging or a combination of both. In all cases, transverse hot working is preferred to minimize any directionality of mechanical properties in the material. Hot working of the slab is advantageously performed within the temperature range of 1700-2150° F., with the reduction in thickness commencing immediately after descaling the cast slab and continuing until the desired plate thickness is achieved, advantageously without reheating. All resulting mold plates are advantageously flattened immediately at the conclusion of hot working while the metal is still hot. Product width to thickness ratio is controlled to assure that the producing facility has adequate power to effectively flatten the product. Free air cooling of the plate after hot working may be used without any precautions or thermal protection procedures. This practice is believed to result in time and cost savings and promotes improved flatness as the product can remain at rest on cooling beds until rigid. Additionally, this practice ensures a minimum of residual internal stresses which results in excellent dimensional stability even after heavy machining. This is a major improvement compared to quenched and tempered steel grades.

Material hardness is controlled by the analysis of the melt, as opposed to reaching the desired hardness level by "tempering" back from an over hardened state as is done with traditional grades for mold bases. The process provides a stainless steel grade that is believed to maintain a stable hardness profile as rolled or as normalized. The addition of a low temperature stress relieving treatment in the range of 450° F. to 650° F. is believed to improve material ductility and increase dimensional stability without changing the as rolled or as normalized hardness. A hardness increase of 4 to 6 Rockwell-C is believed achievable by aging the material between about 700° F. and about 900° F. The stainless steel can be rendered very soft, i.e., below Rockwell-C 20 hardness by over tempering in the 1200° F. to 1300° F. range if necessary to facilitate forming or flattening. Reversion to the planned hardness level is believed achievable by normalizing the material at temperatures of 1650° F. or higher. Plates of the disclosed stainless steel may be provided with a standard heat treatment to a hardness of 30-35 HRC. Hardness above this more standard range is believed obtainable with simple low temperature heat treatment. The maximum hardness attainable is believed to be about 40 HRC.

Due to the chemical analysis with its low Carbon content, the stainless steel possesses safe and simplistic weldability without the need for pre-heating or post heating when welding. Welds and weld repairs can be made on the described stainless steel with no concerns of weld defects nor of deleteriously altering the properties of the base material Referring to FIGS. 1-2, the described, continuously cast, stainless steel is designed for use in manufacturing mold bases for plastic injection mold tooling. The majority of the product for which the stainless steel is designed begins as a piece of saw cut rectangular plate 100 of various dimensions. The plate is milled and/or ground to provide six smooth surfaces at specified dimensions. As needed, cavities of various shapes are formed in the mold base to receive other mold bases, mold cores and/or mold cavities. The excellent flatness of the stainless steel as produced reduces the amounts of material that must be removed from opposing surfaces 101 and 102 to produce flat, parallel clean metal surfaces on the molding plates.

Figure 2A:
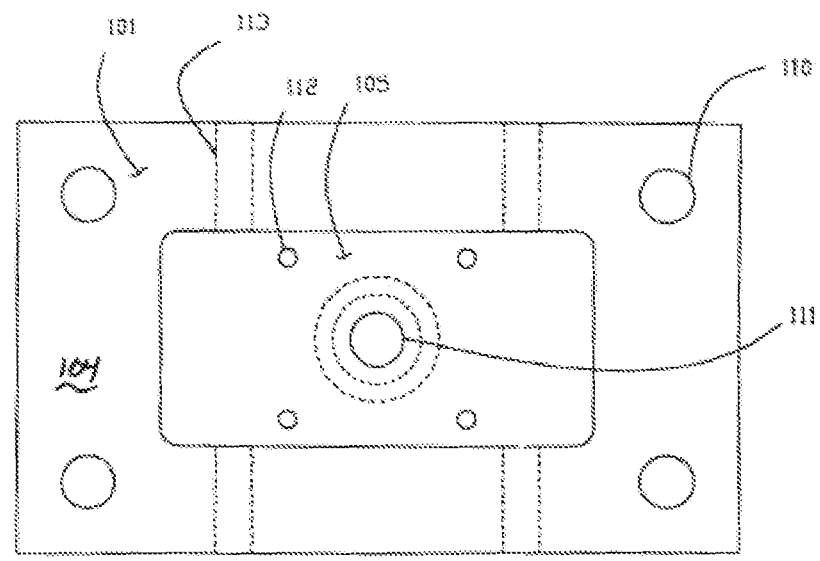
FIG. 2A is top view of a mold plate having a recess and holes formed therein.
Figure 2B:
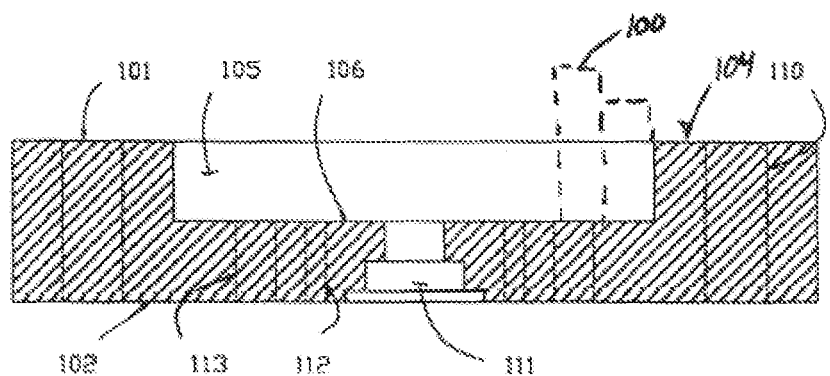
FIG. 2B is a sectional view taken along section 2A-2A of FIG. 2.
Figure 3:
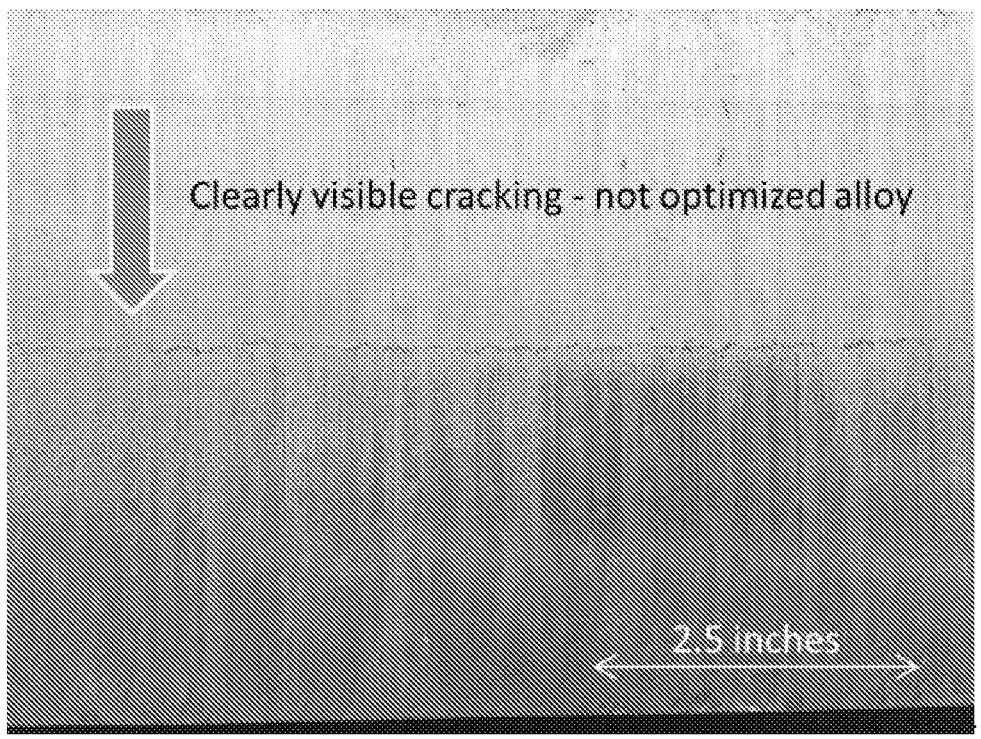
FIG. 3 is a photograph of a plate produced from continuous cast ingot material rolled down to 5.5", wherein due to the segregation of elements like Mn and S towards the center, the microstructure is weakened. In combination with thermal stresses during cooling and further processing, this area is prone to cracks and voids which will not be closed during rolling. The center line crack is marked with the red arrow.
Figure 4:
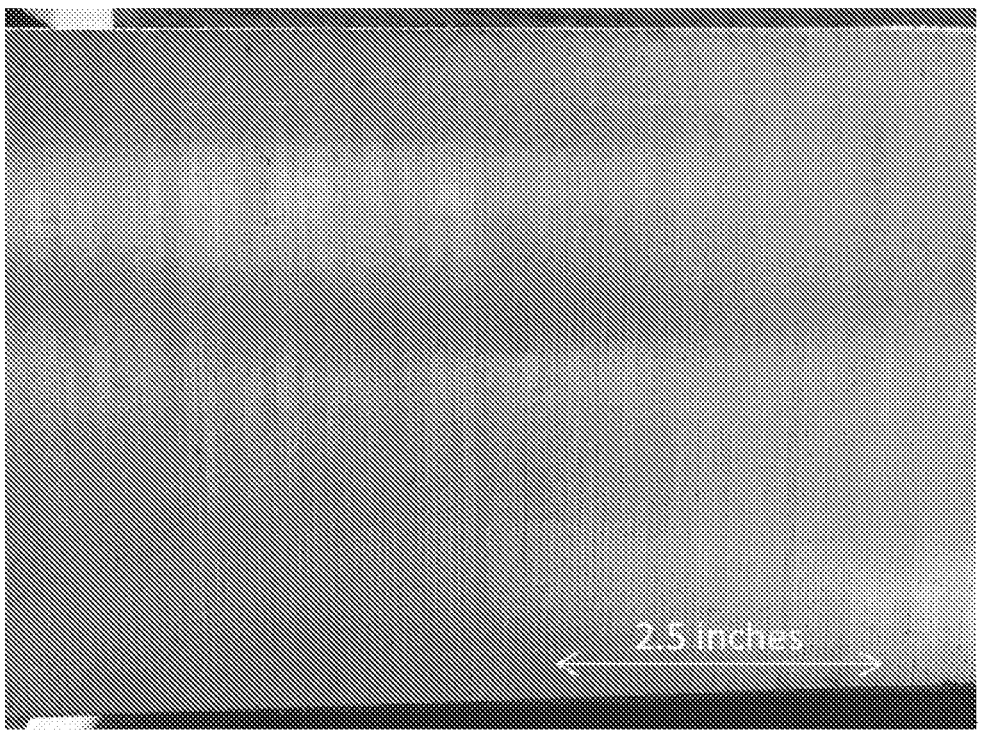
FIG. 4 is a photograph of a plate produced from continuous cast ingot material with improved chemistry rolled down to 5.5". There are no visible centerline segregation or cracks.

FIGS. 2A-2B show an exemplary mold base 104 manufactured from the rectangular plate 100. The mold base 104 is configured to have a rectangular cavity 105 (i.e., main pocket), typically having a flat bottom surface 106. During the manufacture and operation of the mold base 104, it is essential that surfaces 101, 102 and 106 remain parallel at all times. This is difficult when the cavity 105 is large as the removal of the material can warp the plate 100 if the material is not dimensionally stable. For example, parallel surfaces 104, 106, within about 0.005 to 0.010 inches across 24 inches may be desired, and the continuously cast alloy is believed to achieve parallel surfaces within a few thousandths of an inch across that 24-inch dimension. Recesses as large or larger than recess 105, and smaller recesses with the larger recess 105 (e.g., to receive rectangular mold plates containing cores or cavities) are believed suitable for use. The continuously cast, stainless steel thus provides a stable material that does not significantly distort during machining, even after heavy metal removal such as is performed when a "Main Pocket" 105 is formed.

Referring to FIGS. 2A-2B, the mold base 104 may also require many machined holes such as guide pin holes 110, bushing holes 111, ejector pin holes 112, cooling channels 113 and others (e.g, alignment holes, sprues, vents, slides, cores). The continuously cast, stainless steel permits rapid machining of such holes with no danger of breakage around the hole exist area, due to the stainless steel's ductility and the resulting ability to allow internal threads of excellent quality to be formed. Regardless of technology, equipment and controls exercised in machining, errors inevitably occur which require repairs or replacement of machined components. The excellent weldability of the continuously cast, stainless steel allows for weld repairs on the mold base 104 and the excellent machineability allows further machineability as needed for repairs or mold modifications.

FIG. 2B illustrates features of a mold base plate 104 which may form a base plate A, with mold base plate B being a mirror image thereof. Various rectangular mold plates containing the mold parts of harder material forming cavities and cores may be placed in the mold cavity 105 of each plate A and/or B. When joined together by abutting mold surfaces 101 during use, mold base plates A and B form a separation line for the mold plates A and B and the parts held in the cavity 105 between the A and B mold base plates.

The continuously cast, stainless steel allows the mold plates 100, 104 to be produced more easily and less costly than the prior art. The continuously cast plate has a shape as cast that may more closely resemble the rectangular shape required by a multitude of mold plates, with various holes and recesses formed in those rectangular shapes. Starting with a similar basic shape makes it easier and faster to achieve the final shape, and less expensive to do so. The cost advantages of the continuously cast method further reduce the costs. The reduction in waste metal of an ingot compared to the continuously cast slabs further reduces costs, reduces waste and improves efficiency.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The above description is given by way of example, and not limitation. Given the above disclosure, one skilled in the art could devise variations that are within the scope and spirit of the invention. Further, the various features of this invention can be used alone, or in varying combinations with each other and are not intended to be limited to the specific combination described herein. Thus, the invention is not to be limited by the illustrated embodiments.

What is claimed is:

1. A continuous casting process, comprising the steps of: continuously casting a steel alloy comprising 0.04%-0.065% by weight C, about 0.25%-0.5% by weight Si, about 0.9%-1.2% by weight Mn, up to 0.025% P by weight, about 0.1%-0.16% by weight S, about 11.9%-12.8% by weight Cr, about 0.10%-0.35% by weight Ni, 0.50%-0.65% by weight Cu, about 0.03%-0.06% by weight N, about 0.02%-0.1% by weight V, and the balance being Fe with residual impurities, at a temperature between 2730° F. to 2820° F. to form a strand of said alloy; and cutting said strand of said continuously cast alloy to a length to form a slab.

2. The process of claim 1, further comprising the step of cooling said steel alloy by free air cooling to room temperature.

3. The process of claim 1, wherein the slab has a segregation line containing impurities which include C, Mn, P, S, Cr, Ni, Cu, N and V.

4. A process for making a mold base having a cast thickness T, after descaling, comprising the steps of descaling said slab of claim 1;
hot working said slab into plate within a temperature range of about 1700-2150° F. to reduce the thickness of the slab to a plate thickness to about 20% to about 35% of the original thickness T without splitting, chipping or separating the slab at a segregation line of the slab; and
cooling said hot worked plate by free air cooling to room temperature.

5. The process of claim 4, further comprising the step of forming a mold base or a mold plate having a thickness T from said free air-cooled plate, suitable for use in plastic injection molding.

6. The process of claim 4, wherein the hot working step comprises hot rolling the slab sufficiently to reduce the thickness of the slab to about 30% of the thickness T.

7. The process of claim 4, wherein the hot working step comprises press-forging the slab sufficiently to reduce the thickness of the slab to about 30% of the thickness T.

8. The process of claim 4, wherein the slab has a visible segregation line on at least two opposing sides of the mold base, containing impurities which include C, Mn, P, S, Cr, Ni, Cu, N and V.

9. The process of claim 4, further comprising hot leveling said slab after finalizing said hot working.

10. The process of claim 4, further comprising a stress relieving treatment performed in a temperature range of 450-650° F.

11. The process of claim 4, further comprising the step of aging said slab at a temperature range of 700-900° F. to raise the HRC-hardness value of said alloy by 4 to 6 hardness units.

12. The process of claim 1, wherein the step of continuously casting a steel alloy, the steel alloy comprises about 0.55% to 0.65% by weight Cu.

\* \* \* \* \*